Figure 1:
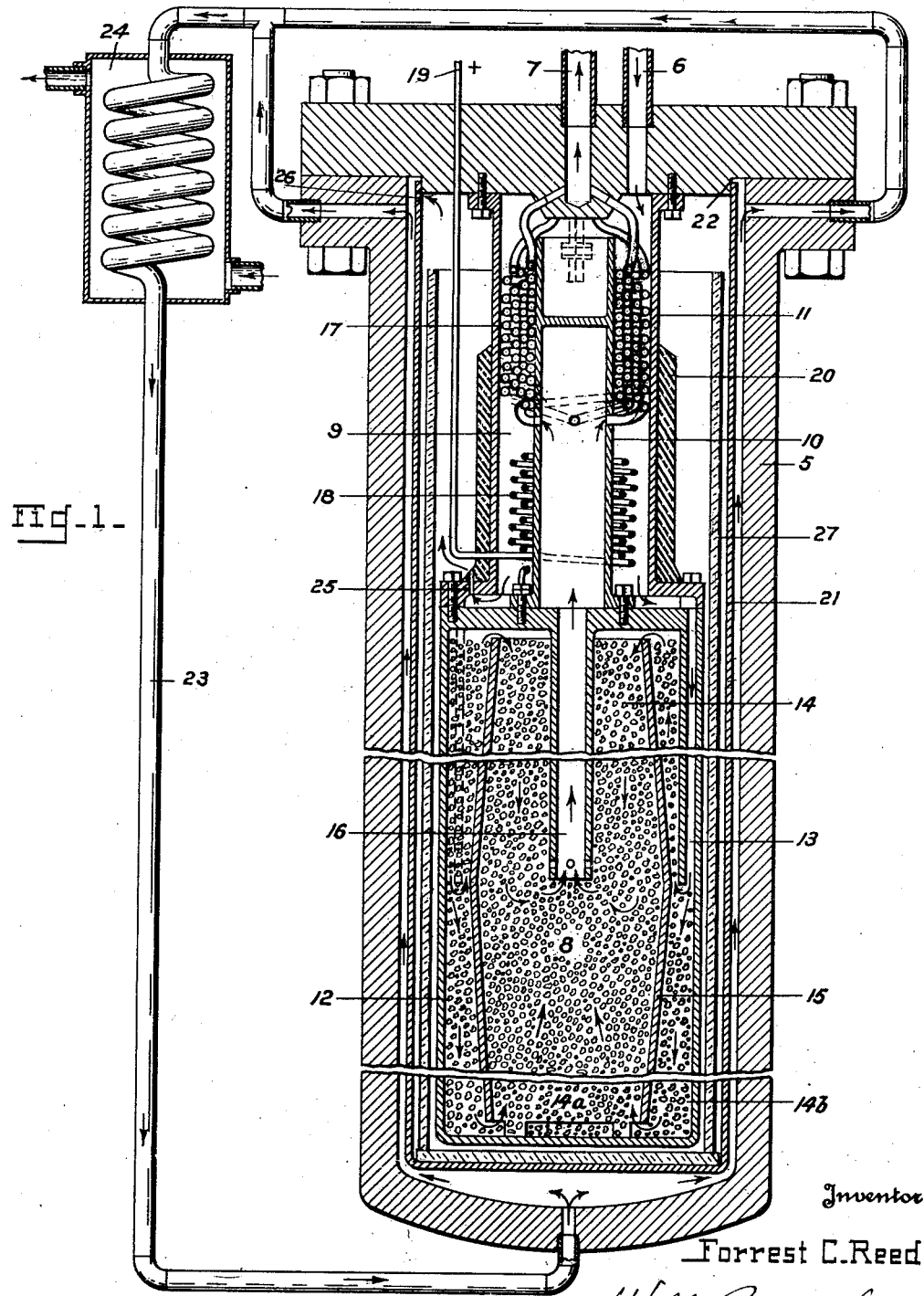

Oct. 30, 1928.

F. C. REED 1,689,684

CATALYTIC APPARATUS FOR THE SYNTHESIS OF AMMONIA

Filed Aug. 2, 1927   2 Sheets-Sheet 1

Inventor
Forrest C. Reed
By W. N. Roach
Attorney

Oct. 30, 1928.  
F. C. REED  
1,689,684  
CATALYTIC APPARATUS FOR THE SYNTHESIS OF AMMONIA  
Filed Aug. 2, 1927  2 Sheets-Sheet 2
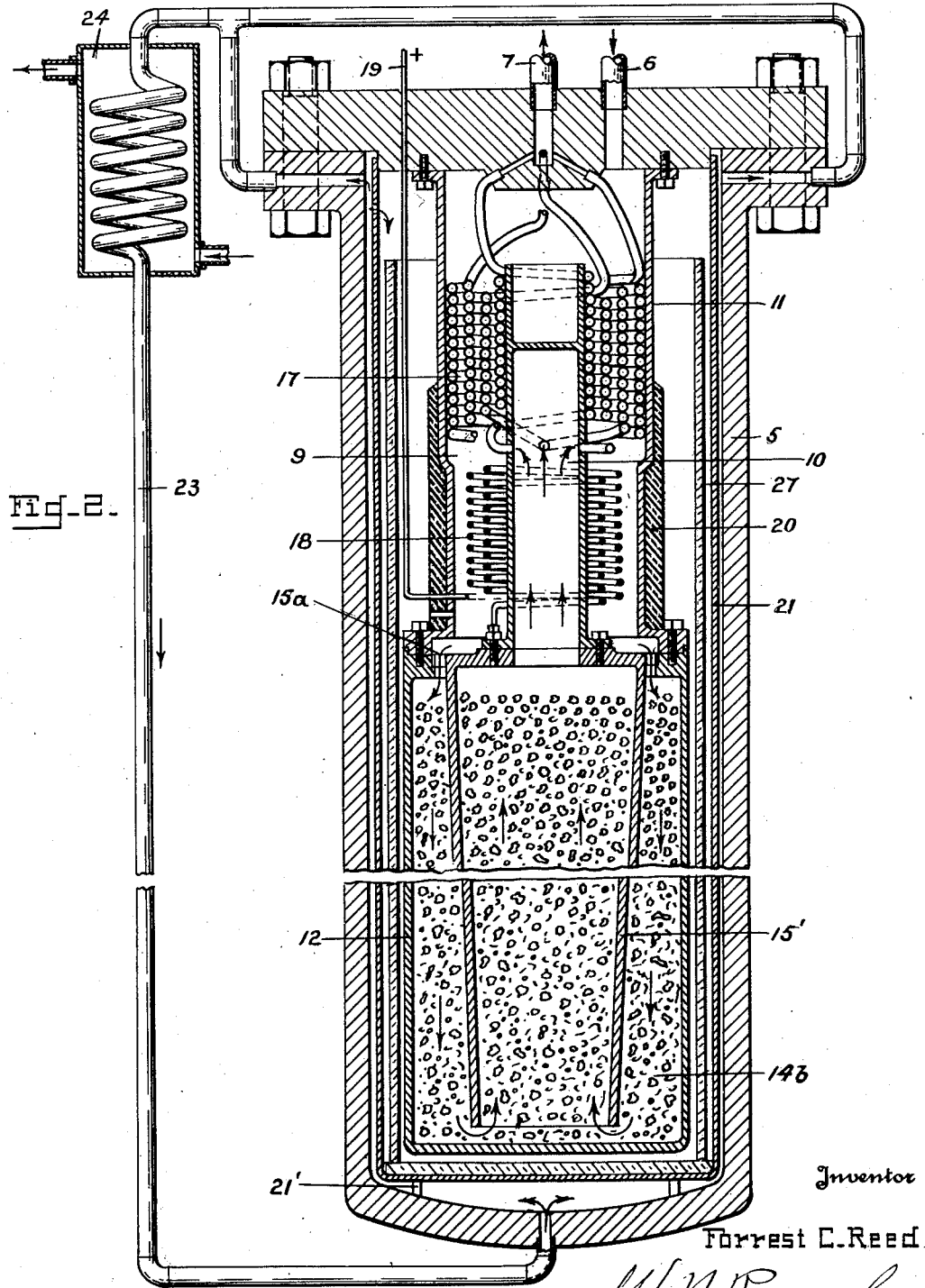
Inventor  
Forrest C. Reed.  
By W. N. Roach.  
Attorney Patented Oct. 30, 1928.

1,689,684

UNITED STATES PATENT OFFICE.

FORREST C. REED, OF SAN FRANCISCO, CALIFORNIA.

CATALYTIC APPARATUS FOR THE SYNTHESIS OF AMMONIA.

Application filed August 2, 1927. Serial No. 210,104.

This invention relates to a catalytic apparatus for the synthesis of ammonia.

The object of the present invention is to provide an improved apparatus for carrying out a process involving the direct synthesis of ammonia from its elements nitrogen and hydrogen.

The apparatus is designed especially with a view to reducing its size, arranging its various elements into a readily removable unit, providing means for temperature control of the process and for the protection of the converter walls, providing improved heat interchange, increasing the efficiency of the apparatus by a novel distribution of the catalyst body and by the direction of flow of the gases therethrough and obtaining flexibility of operation.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings wherein:

Fig. 1 is a longitudinal sectional view of an apparatus constructed in accordance with the invention; and Fig. 2 is a similar view of a modified form.

The converter comprises a pressure sustaining vessel 5 whose cover is provided with an inlet 6 whereby a mixture of hydrogen and nitrogen gas is introduced into the vessel and after being reacted on is conducted together with the gases converted into ammonia through the outlet 7.

Suspended within the vessel 5 by attachment to the cover are a number of concentric cylindrical members establishing a catalyst chamber 8 and an annular heating chamber 9 positioned above the chamber 8. The chamber 9 is proved by inner and outer cylindrical tubes respectively designated 10 and 11, the latter serving as an anchoring means for assembly by being bolted to the cover and carries the container 12 forming the chamber 8. The container 12 in turn carries the inner tube 10.

The catalyst container 12 is provided with passages 13 whereby the incoming gases may be admitted to the catalytic material 14 and these passages terminate midway of the container. The catalytic material is divided into an inner and outer body respectively 14ª and 14ᵇ by an annular baffle 15, the purpose being to make it possible to proportion the volume of the two bodies of catalyst in such a manner that the flow of gas is from the outer to the inner body and so that the heat generated in the outer body in excess of the heat absorbed by the incoming gas and that radiated and conducted outwardly and carried inwardly is less than the total heat generated in, radiated to, and conducted to the inner body. In this manner the average operating temperature of the outer catalyst body is less than the average operating temperature of the inner catalyst body, the temperature difference being preferably from 50° to 150° C. The two catalyst bodies preferably have different percentages of promotors to afford the best efficiencies at their different respective temperatures of operation. As a result the lower temperature is maintained next to the wall of the pressure sustaining vessel for reasons of strength and thereby making it possible to control the distribution of heat within the catalytic body.

The position of the outlet of the passage 13 and the employment of the baffle 15 causes a distribution of the gases, part of which travel upwardly and part downwardly through the outer body 14ᵇ whence the direction of flow is reversed. This division and flow of the gases distributes the heat generated in an axial direction.

The catalyst container 12 is formed with a depending discharge tube 16 terminating at the center of the container. This tube opens into the chamber formed by the inner container 10 and conducts the gases to a heat exchanger 17 disposed in the upper portion of the chamber 9 and herein shown as consisting of a plurality of spirally wound tubes, two tubes being wound together similar to a double screw thread, thus adding to the length and subtracting from the width of the heat exchanger and thereby giving a higher velocity of the gases over the outside of the tubes than is possible with a single winding. The tubes lead to the outlet 7 in the cover of the vessel.

Situated between the heat exchanger and the catalyst chamber is an electric heater 18 having a source of current 19 leading to the exterior of the pressure sustaining vessel. The outer tube 11 is embraced by an insulating member 20 in the vicinity of the heater.

By virtue of the arrangement of the concentric members establishing the heating and catalytic chambers the incoming gases are heated by the outgoing gases and also by the heater before being conducted to the catalyst. The concentric members form a compact unit which may be readily removed with the cover and the catalytic body is not only protected from excessive heat and consequently the walls of the container which hold said body, but also the heater itself is protected from excessive heat. If the pressure at which reaction takes place is high enough and the heat interchanger is properly designed the process becomes autothermal in which case the electric heater is then only necessary for starting.

In order that the walls of the pressure sustaining vessel 5 may be maintained at a temperature compatible with safety provision is made for circulating a cooling medium along the inner wall of the vessel. To this end the chamber forming members are inclosed in a shell 21 which is spaced from the vessel and is retained in place by attachment to an annular flange 22 on the cover. A pipe line 23 fitted into the upper and lower portion of the vessel 5 completes the circuit and includes a condenser 24 which by cooling the gases causes a thermo-siphonal action. In order that a portion of the incoming gases may be utilized as the cooling medium the tube 11 and the shell 21 are provided with small openings, respectively, 25 and 26.

The thermo-siphon thus established protects the walls of the vessel not only by the conduction of heat therefrom but also by diminishing the transfer of heat from the interior of the converter. The action of the system can be increased by placing the condenser above the top of the converter the limiting height being reached when the additional head of gas column thus obtained would be equal to the loss of head due to friction in the additional length of the pipe.

As a means of further protection an insulating shell 27 preferably having reflecting qualities is placed within the shell 21.

The form shown in Fig. 2 is the same as that described with the exception that the baffle 15' is hung from the tube 10 and is also provided with lugs 15ᵃ which rest on the inwardly extending annular flange of the container 12. Also, in this form, the shell 21 is supported or rests on legs 21' so that the top or cover and its connected members may be readily removed without disturbing the shell.

I claim:

1. In an apparatus for the synthesis of ammonia, a pressure sustaining vessel, a plurality of concentric members connected as a unit to the cover of said vessel and forming a catalytic chamber and an annular heating chamber located above the catalytic chamber, a heat exchanger in the upper portion of the heating chamber, a heater in the lower portion thereof, means for admitting the incoming gases to the heating chamber, means for conducting them into the catalytic chamber at points midway of the wall of said chamber, an annular baffle within the catalytic chamber for directing the flow of gases in an axial direction, means for conducting the gases from the center of the catalytic chamber to the heat exchanger, a cylindrical shell attached to the cover of the vessel and spaced from the concentric members and the vessel, and a circulating line including a condenser connecting the upper portion and the under portion of the vessel.

2. In an apparatus for the synthesis of ammonia, a pressure sustaining vessel, a plurality of concentric members within said vessel forming a catalytic chamber and an annular heating chamber located above the catalytic chamber, a heat exchanger in the upper portion of the heating chamber, a heater in the lower portion thereof, means for admitting the incoming gases to the heating chamber, means for conducting them into the catalytic chamber at points midway of the wall of said chamber, an annular baffle within the catalytic chamber for directing the flow of gases in an axial direction, means for conducting the gases from the center of the catalytic chamber to the heat exchanger, a cylindrical shell spaced from the inside wall of the vessel, and a circulating line including a condenser connecting the upper portion and the under portion of the vessel.

3. In an apparatus for the synthesis of ammonia, a pressure sustaining vessel, a plurality of concentric members within said vessel forming a catalytic chamber and an annular heating chamber located above the catalytic chamber, a heat exchanger in the upper portion of the heating chamber, a heater in the lower portion thereof, means for admitting the incoming gases to the heating chamber, means for conducting them into the catalytic chamber at points midway of the wall of said chamber, an annular baffle within the catalytic chamber for directing the flow of gases in an axial direction, and means for conducting the gases from the center of the catalytic chamber to the heat exchanger.

4. In an apparatus for the synthesis of ammonia, a pressure sustaining vessel, a plurality of concentric members within said vessel forming a catalytic chamber and an annular heating chamber located above the catalytic chamber, means for admitting the incoming gases to the heating chamber, means for conducting them into the catalytic chamber at points midway of the wall of said chamber, an annular baffle within the catalytic chamber and a discharge tube terminating in the center of the catalytic chamber.

5. In an apparatus for the synthesis of ammonia, a pressure sustaining vessel, a catalyst container within the vessel, an annular baffle within the container and means whereby incoming gas is admitted to the container at points midway of its walls.

6. In an apparatus for the synthesis of ammonia, a pressure sustaining vessel, a plurality of concentric members within said vessel and forming a catalytic chamber and an annular heating chamber located above the catalytic chamber, a heat exchanger in the upper portion of the heating chamber and a heater in the lower portion thereof.

7. In an apparatus for the synthesis of ammonia, a pressure sustaining vessel having a removable cover and a plurality of concentric members connected as a unit to the cover and forming a catalytic chamber and a heating chamber located above the catalytic chamber.

8. In an apparatus for the synthesis of ammonia, a pressure sustaining vessel having a removable cover and a plurality of concentric members connected as a unit to the cover and forming a catalytic chamber and a heating chamber.

9. An apparatus for the synthesis of ammonia, a pressure sustaining vessel, a reaction unit within said vessel, a cylindrical shell surrounding the unit and spaced from the vessel, and a circulating line including a condenser connecting the upper and lower portions of said vessel.

FORREST C. REED.